United States Patent [19]

Stover

[11] 3,718,553
[45] Feb. 27, 1973

[54] CRACKING OVER CONTAMINATED CATALYST

[75] Inventor: William A. Stover, Woodbury, N.J.

[73] Assignee: Mobil Oil Corporation, New York, N.Y.

[22] Filed: Dec. 28, 1970

[21] Appl. No.: 102,128

[52] U.S. Cl. ................................................208/120
[51] Int. Cl. .......................C10g 11/02, C10g 11/04
[58] Field of Search........................................208/120

[56] References Cited

UNITED STATES PATENTS

| | | | |
|---|---|---|---|
| 3,509,042 | 4/1970 | Miale | 208/120 |
| 3,271,418 | 9/1966 | Plank et al. | 208/120 |
| 3,210,267 | 10/1965 | Plank et al. | 208/120 |
| 3,276,993 | 10/1966 | Reid | 208/120 |
| 3,143,491 | 8/1964 | Bergstrom | 208/120 X |
| 2,914,459 | 11/1959 | Mills et al. | 208/120 X |
| 3,400,072 | 9/1968 | Tung et al. | 208/120 |
| 3,150,075 | 9/1964 | Russell et al. | 208/120 |
| 3,255,102 | 6/1966 | Sanford et al. | 208/120 |
| 3,146,188 | 8/1964 | Gossett | 208/120 X |
| 3,120,484 | 2/1964 | Mills et al. | 208/120 |

*Primary Examiner*—Patrick P. Garvin
*Assistant Examiner*—P. F. Shaver
*Attorney*—Oswald G. Hayes, Andrew L. Gaboriault, Raymond W. Barclay and James F. Woods

[57] ABSTRACT

A process for cracking, in the absence of hydrogen, a gas oil charge, which comprises contacting said gas oil charge under catalytic cracking conditions with a catalyst, consisting of a crystalline aluminosilicate, having an exchangeable sodium content of less than 4 weight percent, contained in a porous matrix, which catalyst has impregnated thereon, prior to contact with said gas oil charge, a controlled amount of nickel, iron or vanadium in an amount of 100 to 1,000 ppm. of at least one of said metals and recovering from the cracked products, a gasoline of higher octane number than that capable of realization by cracking said charge under identical conditions with an otherwise identical catalyst, but which had not undergone initial impregnation with at least one of said metals.

12 Claims, No Drawings

3,718,553

CRACKING OVER CONTAMINATED CATALYST

BACKGROUND OF THE INVENTION

1. Field of the Invention

This invention is directed to the cracking of gas oils with a catalyst which contains a controlled amount of a contaminant metal such as iron, nickel or vanadium maintained on a crystalline aluminosilicate zeolite.

2. Discussion of the Prior Art

The cracking of gas oils over crystalline aluminosilicate zeolites is broadly known and disclosed in numerous patents such as U.S. Pat. No. 3,140,249. Crystalline aluminosilicate zeolites, especially in a rare earth metal form contained in a matrix of silica or silica-alumina, provide superactivity and excellent yields of high octane products at standard cracking conditions. Certain metals such as nickel, iron and vanadium have heretofore been known to be contaminants in the cracking of gas oil charge stocks. These metals are normally considered to be catalyst poisons in cracking operations carried out in the absence of hydrogen. However, it has now been found that these metals can indeed be useful components of a catalyst comprising a crystalline aluminosilicate zeolite for normal catalytic cracking to provide products of a still higher octane number than obtained from a similar operation, but in which the catalyst does not have the above specified metals initially impregnated thereon.

SUMMARY OF THE INVENTION

A process for cracking, in the absence of hydrogen, a gas oil charge which comprises contacting said gas oil charge under catalytic cracking conditions with a catalyst consisting of a crystalline aluminosilicate, having an exchangeable sodium content of less than 4 weight percent, contained in a porous matrix, which catalyst has impregnated thereon, prior to contact with said gas oil charge, a controlled amount of nickel, iron or vanadium in an amount of 100 to 1,000 ppm. of at least one of said metals and recovering from the cracked products, a gasoline of higher octane number than that capable of realization by cracking said charge under identical conditions with an otherwise identical catalyst, but which had not undergone initial impregnation with at least one of said metals.

DESCRIPTION OF PREFERRED EMBODIMENTS

The essence of the present invention involves the utilization of materials heretofore considered cracking catalyst poisons when contained in gas oil feed stocks. These metals, iron, nickel and vanadium, when present in minor quantities in gas oil have been found to have a deleterious effect upon cracking carried out in the absence of a hydrogen atmosphere. The discovery that by employing a pre-impregnated catalyst containing a controlled amount of nickel, iron or vanadium in an amount of 100 to 1,000 ppm. based on moisture-free catalyst of at least one of said metals, one can obtain a gasoline fraction of higher octane number in the cracking of a gas oil charged, characterized by a combined metal contaminant content of iron, nickel and vanadium of less than 1,000 ppm. is fundamental to the invention. It is apparent that the degree of pre-impregnation of the catalyst material with the iron, nickel or vanadium must be to some extent correlated with the combined metal contaminant content of the gas oil feed. The catalyst should initially contain between 100 and 1,000 ppm. of at least one of said metal contaminants based on the weight of the finished catalyst. However the upper limit could be considered extremely important in that should the gas oil contain a high amount of metal contaminants such as above 5 ppm., the catalyst could become contaminated to such an extent that the desirable yield of cracked products such as gasoline at the expense of coke will not be obtained. Of course, if the gas oil feed is free of metal contaminants, the process can be conducted with a catalyst at the upper metal contaminant content level of 1,000 ppm.

Cracking catalysts pursuant to the present invention comprise a crystalline aluminosilicate zeolite component and an amorphous matrix material which itself may be active or inactive. Crystalline aluminosilicate zeolites contemplated are those known as molecular sieves and are characterized by high catalytic activity. Such zeolites can be either natural or synthetic. Particularly contemplated natural zeolites include faujasite, chabazite, and mordenite as well as the smaller pore zeolites such as offretite and erionite. Synthetic zeolites particularly contemplated include especially zeolites X, Y, A, T, alpha, beta, ZK-4, ZK-5, ZSM-4, as described in British Pat. No. 1,117,568 and ZSM-5 as described in Belgian Pat. No. 713,516. It is to be understood that other natural and synthetic zeolites are also contemplated as the zeolite component of the catalyst of the present invention. The crystalline aluminosilicate zeolite component of the catalyst is in a low alkali metal form, i.e., contains less than 4 weight percent alkali metal, usually sodium. Preferably, the alkali metal content is below 1 weight percent. Reduction of the alkali metal content is accomplished by exchange with a source of hydrogen cations or cations decomposable to hydrogen or a desired metal cation especially metals of Groups II-VIII of the Periodic Table. Of these metals, it is preferred that a rare earth metal or mixture of rare earth metals be the desired metal cation of the crystalline aluminosilicate. Additionally, the controlled amount of iron or nickel can be placed on the catalyst by ion exchange in which case the ion exchange technique accomplishes a dual function—reduction of the alkali metal content and the deposition of the desired controlled amount of iron or nickel.

Ion exchange is accomplished in the known manner by using a salt of the desired metal in a solution, usually an aqeuous solution. The temperature of the ion exchange solution is usually at room temperature although good results are obtained employing a solution having a temperature up to the boiling point of the solvent. Under pressure conditions, the temperatures higher than the normal boiling point of the solution can be employed. The ion exchange can be performed on the zeolite component before or after admixture with the porous matrix material. Excellent results are achieved by ion exchanging the crystalline aluminosilicate apart from the matrix material and calcining the so exchanged material at a temperature of 500°-1,500 °F. prior to incorporation of the zeolite component with the matrix. The matrix is thereafter exchanged when in admixture with the zeolite component which exchange effectuates still further reduction of the alkali metal content. It should be noted that one can, for instance, ion exchange the crystalline aluminosilicate zeolite with a rare earth salt solution, calcine it, incorporate the aluminosilicate with the porous matrix material and accomplish further exchange of the combined materials with the controlled amounts of nickel and iron in which case alkali metals in both components will be removed and the controlled amounts of added metals will be deposited uniformly throughout the catalyst composition.

The crystalline aluminosilicate component either before or after exchange with the desired metal, e.g., rare earth incorporation therein of the controlled amounts of iron, nickel or vanadium is intimately combined with a porous amorphous matrix material. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the zeolite, i.e., combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Normally, non-fluid zeolite catalyst materials have been incorporated into naturally-occuring clays, e.g., bentonite and kaolin, to improve the crush strength of the catalyst under commercial operating conditions. These materials, i.e., clays, oxides, etc., function as binders for the catalyst. It is desirable to provide a catalyst having good crush strength because in a petroleum refinery the catalyst is often subjected to rough handling, which tends to break the catalyst down into powder-like materials which cause problems in processing. These clay binders have been employed normally only for the purpose of improving the crush strength of the catalyst.

Naturally occurring clays which can be composited with the zeolite component include the montmorillonite and kaolin family, which families include the sub-bentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the zeolite component also include inorganic oxides, notably alumina.

In addition to the foregoing materials, the zeolite can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely-divided crystalline aluminosilicate, and inorganic oxide gel matrix vary widely with the crystalline aluminosilicate content ranging from about 1 to about 90 percent by weight and more usually, particularly when the composite is prepared in the form of beads, in the range of about 2 to about 50 percent by weight of the composite. The matrix material may also have clay incorporated, usually added with the component to be cogelled.

Employing the catalyst of this invention for catalytic cracking, hydrocarbon cracking stocks can be cracked at a liquid hourly space velocity between about 0.5 and 50, a temperature between about 550°F. and 1,100°F., a pressure between about subatmospheric and several hundred atmospheres.

In order to more fully illustrate the nature of the present invention and the manner of practicing the same, the following examples are presented:

EXAMPLE 1

12,120 Grams of Q-Brand sodium silicate were dissolved in 125 pounds of water and mixed well. The solution was heated to 120°F. To the heated solution was added 340 cubic centimeters of 96.8 percent $H_2SO_4$ to a final pH of 10.1. The solution was heated to 140°F. and held at 140°F. for 3 hours during which the silicate formed a gelled slurry. To the gelled slurry was added 20 percent $Al_2(SO_4)_3$ solution containing 3,024 grams $Al_2(SO_4)_3 \cdot 14\ H_2O$ at a uniform rate over a ½ hour period. The amount of aluminum sulfate was sufficient to give about 13 percent alumina based on the weight of the silica-alumina matrix being formed. The resultant pH was 3.5. Thereafter, a saturated solution of sodium carbonate was added until the pH measured 4.7.

A sample of zeolite Y which had been initially exchanged with rare earth chloride solution to a sodium content of about 3 percent by weight and then calcined, was dispersed in a rare earth chloride solution. Specifically, 216 grams of the calcined REY were dispersed in a solution of 64 grams $RECl_3 \cdot 6\ H_2O$ in 600 cubic centimeters water. The dispersed REY in the solution was added to the 4.7 pH silica-alumina gelled slurry, and the resultant material was homogenized and spray dried. The dried product was twice slurried with 6 gallons of water, let settle and the supernatant liquid was decanted. It was placed in a column and continuously exchanged by passing 20 gallons of an aqueous 5 percent ammonium sulfate solution through the columns. Thereafter, it was water washed until the effluent was substantially free of sulfate ion. It was then dried at 250°F. The resultant material was mixed with a short-resid containing metals in an amount equal in weight to the composite catalyst. The so impregnated material was burned clean of the burnable portion of the short resid by heating it to 1,100°F. in air, depositing the metals onto the catalyst. Thereafter, the metal impregnated catalyst was steamed for 4 hours at 1,400°F. at atmospheric pressure.

EXAMPLE 2

Two pounds of a commercially available 13X zeolite were subjected to two 3 hour ion exchanges each with 3 liters of 0.333 molar lanthanum chloride aqueous solution. The exchange was performed at room temperature. The resultant material was calcined for 5 hours at 900°F. in air. Thereafter, it was exchanged once for 20 hours with 3 liters of a 1 molar nickel chloride solution at room temperature. It was again calcined for 5 hours at 900°F. in air and analyzed. The analysis of the product is set forth below.

COMPOSITION OF PRODUCT

| COMPONENT | PERCENT, WT. |
|---|---|
| Sodium | 0.75 |
| Silica | 41.9 |
| Rare Earth Oxide | 23.7 |
| Alumina | 28.5 |
| Nickel | 3.08 |

7,575 grams of Q-Brand sodium silicate were dissolved in 100 pounds of water and mixed well. The solution was heated to 120°F. and 96.1 percent sulfuric acid was added at a uniform rate of ½ hour period. A total of 212 cubic centimeters were added. The resultant pH of the solution was 10.2.

The solution was heated to 140°F. and held at 140°F. for 2 hours during which the silicate formed a gelled slurry. To the gelled slurry was mixed in 20 percent $AL_2(SO_4)_3$ solution containing 1,890 grams $Al_2(SO_4)_3$ 14 $H_2O$ so that the resultant silica-alumina matrix material will contain about 13 percent by weight alumina. The pH at this stage was determined to be 3.6. A saturated solution of sodium carbonate was added thereto to adjust the pH to 4.5 and 5.0. After 800 cubic centimeters of the solution was added, the pH was determined to be 4.8.

209 grams of the rare earth nickel zeolite X prepared in accordance with the first stated paragraph above was dispersed in a solution of 63 grams of $RECl_3 \cdot 6 H_2O$ (where RE means rare earth) in 600 cubic centimeters water to 7.5 weight percent RENiX. The RENiX dispersed in $RECl_3 \cdot 6H_2O$ solution was mixed into the silica-alumina slurry. The dispersion was homogenized and spray dried. The dried product was slurried with 6 gallons of water and then allowed to settle. The water was decanted. This was performed twice. The product was placed in a column and then exchanged continuously with 15 gallons of an aqueous 5 percent $(NH4)_2 SO4$ solution. Thereafter, it was washed sulfate free and dried at 275°–300°F. The material was steamed for 4 hours at 1400°F. under atmospheric pressure.

EXAMPLE 3

The catalysts of Examples 1 and 2 were evaluated for fluid catalytic cracking of a wide cut Mid Continent gas oil. Both catalyst materials had particle sizes between 10 and 150 microns in diameter. They were evaluated against the same catalyst which did not contain added metals. The cracking was performed at 925°F. at a 5 weight hourly space velocity. The weight ratio of catalyst to oil was 5. In Table 1 below, there is set forth the comparative data of the two materials against the control catalysts.

TABLE 1

Effect of Metals Activation on Product Quality from Zeolitic Fluid Catalyst

| | Ex. 1 | Ex. 1 Control | Ex. 2 | Ex. 2 Control |
|---|---|---|---|---|
| metals Added, ppm. | | | | |
| Ni | 80 | 0 | 180 | 0 |
| V | 92 | 0 | 0 | 0 |
| Fe | 480 | 0 | 0 | 0 |
| Cu | 10 | 0 | 0 | 0 |
| 925°F., 5C/O, 5 WHSV, | | | | |
| Conversion, % vol. | 68.4 | 72.6 | 77.0 | 78.6 |
| $C_5+$ Gasoline, % vol. | 53.8 | 58.3 | 58.3 | 59.5 |
| $C4's$, % vol. | 15.0 | 16.2 | 17.6 | 18.9 |
| Dry Gas, % wt. | 7.1 | 7.0 | 8.5 | 8.9 |
| Coke, % wt. | 3.2 | 3.1 | 5.4 | 4.6 |
| Research Octane Number +3 cc TEL of $C_5+$ Gasoline | 97.6 | 95.8 | 97.7 | 95.5 |

From the above table, it can be seen that in both instances, the catalyst having a minor amount of added metal provides significantly better results in terms of the octane value of the gasoline fraction. It is seen from this data that this difference is a significant one which is independent of the method by which the metals are added to the cracking catalyst or the nature of the specific molecular sieve catalyst employed. These results are considered particularly surprising since added metals have long been regarded as poisons. That such materials provide beneficial results is not predictible from the state of the art.

I claim:

1. A process for cracking, in the absence of hydrogen, a gas oil charge, characterized by a combined metal contaminant content of iron, nickel and vanadium of less than 5 ppm. which comprises contacting said gas oil charge under catalytic cracking conditions with a catalyst consisting of a crystalline aluminosilicate zeolite, having an exchangeable sodium content of less than 4 weight percent, contained in a porous matrix, which zeolite is in a rare earth exchanged form and said matrix has impregnated thereon, prior to contact with said gas oil charge, a controlled amount of nickel, iron, vanadium or combinations thereof in an amount of 100 to 1,000 ppm. of at least one of said metals, and recovering from the cracked products a gasoline of higher octane number than that capable of realization by cracking said charge under identical conditions with an otherwise identical zeolite catalyst and matrix but which had not undergone impregnation on the matrix with at least one of said metals prior to contact with said gas oil charge.

2. A process according to claim 1 wherein the crystalline aluminosilicate is zeolite X.

3. A process according to claim 2 wherein said zeolite X is composited with an inorganic oxide matrix material.

4. A process according to claim 3 wherein said inorganic oxide matrix material is silica-alumina.

5. A process according to claim 1 wherein said crystalline aluminosilicate is zeolite Y.

6. A process according to claim 5 wherein the rare earth exchanged zeolite Y is composited with an inorganic oxide matrix material.

7. A process according to claim 6 wherein said inorganic oxide matrix material is silica-alumina.

8. A process according to claim 1 wherein said matrix contains nickel.

9. A process according to claim 1 wherein said matrix contains a combination of nickel, iron and vanadium.

10. A process according to claim 4 wherein the zeolite contains hydrogen ions.

11. A process according to claim 7 wherein the zeolite contains hydrogen ions.

12. A process according to claim 1 wherein the zeolite has a particle size between 10 and 150 microns.

* * * * *